US012679218B2

(12) United States Patent
Grubic et al.

(10) Patent No.: US 12,679,218 B2
(45) Date of Patent: Jul. 14, 2026

(54) HEAT GENERATION FOR THE PURPOSE OF WARMING UP AN EV BATTERY IN COLD WEATHER

(71) Applicant: Canoo Technologies Inc., Torrance, CA (US)

(72) Inventors: Stefan Grubic, Redondo Beach, CA (US); Ernesto Inoa, Villa Rica, GA (US); Majd Abdelqader, Redondo Beach, CA (US)

(73) Assignee: WHS ENERGY SOLUTIONS, LLC, Argyle, TX (US)

( * ) Notice: Subject to any disclaimer, the term of this patent is extended or adjusted under 35 U.S.C. 154(b) by 112 days.

(21) Appl. No.: 18/393,413

(22) Filed: Dec. 21, 2023

(65) Prior Publication Data

US 2025/0206147 A1 Jun. 26, 2025

(51) Int. Cl.
| | |
|---|---|
| *B60L 15/20* | (2006.01) |
| *B60L 58/27* | (2019.01) |
| *H01M 10/615* | (2014.01) |
| *H01M 10/625* | (2014.01) |
| *H01M 10/633* | (2014.01) |
| *H01M 10/657* | (2014.01) |
| *H02P 29/62* | (2016.01) |

(52) U.S. Cl.
CPC .............. *B60L 15/20* (2013.01); *B60L 58/27* (2019.02); *H01M 10/615* (2015.04); *H01M 10/625* (2015.04); *H01M 10/633* (2015.04); *H01M 10/657* (2015.04); *H02P 29/62* (2016.02); *B60L 2240/421* (2013.01); *B60L*

*2240/423* (2013.01); *B60L 2240/545* (2013.01); *B60L 2240/662* (2013.01); *H01M 2220/20* (2013.01)

(58) Field of Classification Search
None
See application file for complete search history.

(56) References Cited

U.S. PATENT DOCUMENTS

| | | | |
|---|---|---|---|
| 11,218,045 B2 | 1/2022 | Yang et al. | |
| 2009/0118884 A1 | 5/2009 | Heap | |
| 2012/0021258 A1 | 1/2012 | Kelty et al. | |
| 2012/0200241 A1* | 8/2012 | Kojima .................. | B60L 58/25 |
| | | | 318/139 |
| 2012/0261397 A1 | 10/2012 | Schwarz et al. | |
| 2013/0033203 A1 | 2/2013 | Luke et al. | |

(Continued)

OTHER PUBLICATIONS

Singh et al., "Direct torque control: a practical approach to electric vehicle", IEEE Power India Conference, 2006, pp. 1-4.

*Primary Examiner* — Navid Z. Mehdizadeh
*Assistant Examiner* — Jason R Roberson
(74) *Attorney, Agent, or Firm* — ALLEN, DYER, DOPPELT, GILCHRIST, P.A. Attorneys at Law

(57) ABSTRACT

An operating point for a vehicle electric motor is selected to produce requested torque inefficiently, to generate additional heat to warm the battery. A torque command for operation of the vehicle at a desired speed and a heat power command for an amount of heat needed to warm a battery powering the vehicle electric motor are received by a motor controller. The motor controller determines an operating point of the vehicle electric motor that corresponds to both the requested torque and the amount of heat, and the vehicle electric motor is controlled based on the determined operating point.

18 Claims, 8 Drawing Sheets

(56) References Cited

U.S. PATENT DOCUMENTS

| | | | |
|---|---|---|---|
| 2013/0103240 A1* | 4/2013 | Sato | H02J 7/007192 |
| | | | 701/22 |
| 2015/0284005 A1* | 10/2015 | Suzuki | B60T 8/175 |
| | | | 701/22 |
| 2016/0276935 A1 | 9/2016 | Arai | |
| 2017/0217328 A1 | 8/2017 | Patel | |
| 2017/0253143 A1 | 9/2017 | Tang | |
| 2020/0220132 A1 | 7/2020 | Bourke et al. | |
| 2022/0329184 A1* | 10/2022 | Lian | B60L 58/10 |
| 2022/0371396 A1 | 11/2022 | Cochran et al. | |

* cited by examiner

250

600

601

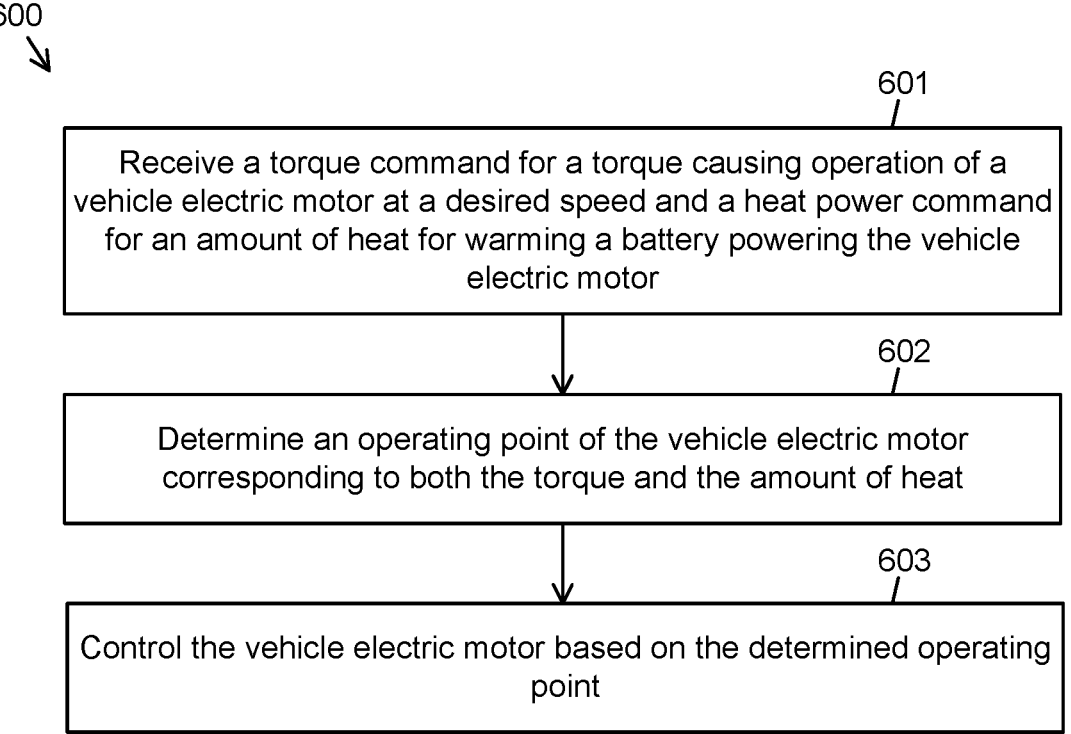

Receive a torque command for a torque causing operation of a vehicle electric motor at a desired speed and a heat power command for an amount of heat for warming a battery powering the vehicle electric motor

602

Determine an operating point of the vehicle electric motor corresponding to both the torque and the amount of heat

603

Control the vehicle electric motor based on the determined operating point

FIG. 6

HEAT GENERATION FOR THE PURPOSE OF WARMING UP AN EV BATTERY IN COLD WEATHER

TECHNICAL FIELD

This disclosure relates generally to heating batteries. More specifically, this disclosure relates to heating batteries for an electric vehicle without requiring additional parts.

BACKGROUND

Batteries, the main energy source used in electric vehicles (EVs), have degraded performance if the temperature is too low. Therefore, many EV manufacturers include heat pumps or heaters to increase the battery's temperature when necessary. However, such parts increase the weight and cost of the final product, and may never be used if, for instance, the car is sold and only used in a warm weather location.

SUMMARY

This disclosure relates to providing the necessary heat needed by an EV battery if the temperature is too low, without the need for auxiliary heat sources.

An operating point for a vehicle electric motor is selected to produce requested torque inefficiently, to generate additional heat to warm the battery. A torque command for operation of the vehicle at a desired speed and a heat power command for an amount of heat needed to warm a battery powering the vehicle electric motor are received by a motor controller. The motor controller determines an operating point of the vehicle electric motor that corresponds to both the requested torque and the amount of heat, and the vehicle electric motor is controlled based on the determined operating point.

In certain embodiments, a method includes receiving a torque command for a torque causing operation of a vehicle electric motor at a desired speed and a heat power command for an amount of heat for warming a battery powering the vehicle electric motor. An operating point of the vehicle electric motor corresponding to both the torque and the amount of heat is determined. The vehicle electric motor is controlled based on the determined operating point.

In certain embodiments, a system includes a vehicle electric motor, and a motor controller. The motor controller is configured to receive a torque command for a torque causing operation of a vehicle electric motor at a desired speed and a heat power command for an amount of heat for warming a battery powering the vehicle electric motor. The motor controller is also configured to determine an operating point of the vehicle electric motor corresponding to both the torque and the amount of heat. The motor controller is further configured to control the vehicle electric motor based on the determined operating point.

In some embodiments, an operating point of the vehicle electric motor corresponding to both the torque and the amount of heat is determined by measuring speed of the motor, determining a required traction power based on the torque and the motor speed, and determining current commands for controlling the vehicle electric motor based on the required traction power and the heat power command.

In some embodiments, current commands for controlling the vehicle electric motor based on the required traction power and the heat power command are determined by measuring battery output power, and subtracting the battery output power from a value determined based on the required traction power and the heat power command to determine required power for the desired speed and the amount of heat.

In some embodiments, a proportional-integral-derivative (PID) control is applied to the determined required total power for the desired speed and the amount of heat.

In some embodiments, thermal limits are applied to an output of the PID control.

In some embodiments, an operating point of the vehicle electric motor corresponding to both the torque and the amount of heat is determined by processing the torque command to determine the torque.

In some embodiments, the heat command is based on one or more of a battery temperature and an ambient temperature.

In some embodiments, an operating point of the vehicle electric motor corresponding to both the torque and the amount of heat is determined by, based on the torque command and the heat power command, looking up current commands for controlling the vehicle electric motor in power loss tables.

In some embodiments, the current commands are forwarded to an integrated dynamic-control module.

In some embodiments, an inverter coupled to the vehicle electric motor is controlled, to control the vehicle electric motor based on the determined operating point.

Other technical features may be readily apparent to one skilled in the art from the following figures, descriptions, and claims.

BRIEF DESCRIPTION OF THE DRAWINGS

For a more complete understanding of this disclosure and its advantages, reference is now made to the following description taken in conjunction with the accompanying drawings, in which like reference numerals represent like parts:

FIG. 6 is a high level flowchart for a process of controlling torque and heat production in an in accordance with embodiments of the present disclosure.

DETAILED DESCRIPTION

FIGS. 1 through 6, described below, and the various embodiments used to describe the principles of this disclosure are by way of illustration only and should not be construed in any way to limit the scope of this disclosure. Those skilled in the art will understand that the principles of this disclosure may be implemented in any type of suitably arranged device or system.

Instead of using an auxiliary heat source, the present disclosure uses heat produced by the electric drive unit (motor and inverter) of the EV. All physical systems are less than 100% efficient—that is, the output energy is lower than the input energy. The difference between input and output energy is normally transformed into heat. A significant amount of effort goes into optimizing drive components, controls, and calibrations so that the vehicle traction system is as efficient as possible. In other words, the energy converted into heat in the drive unit is minimized, by design. In contrast, the present disclosure purposely increases the amount of heat produced by the drive unit in a controlled manner when additional heat is needed, by applying operating points that result in larger losses while maintaining the requested torque. The additional heat is utilized to warm up the battery.

In an electric motor, traction torque is produced by controlling the current's magnitude and angle as measured with respect to the magnetic flux of the rotor. There are several combinations of current magnitude and angle (a/k/a operating points) that produce the same traction torque. The most common operating strategy used in electric drivetrains is called maximum torque per amp (MTPA), which aims to minimize copper losses (heat) in the drive by generating torque with the smallest amount of alternating current (AC) power possible.

If the purpose of the electric motor is solely to produce traction torque, the operating points given by MTPA are preferred. The present disclosure uses other operating points to increase the desired amount of heat while maintaining the requested traction torque.

Producing a controlled amount of heat while also producing a desired amount of traction torque is challenging. To achieve both goals, a control system constantly monitors the heat produced, indirectly by measuring the input power and the motor speed, and having a table in memory relating torque to operating points. Since input power is the product of input current and input voltage (both direct current) and output power is the product speed and torque, the amount of heat generated can be determined from the difference between input power and output power.

The present disclosure utilizes the drivetrain (electric motor and inverter) and associated controls features facilitated by the drive and vehicle software, resulting in less weight, less needed space, and less material costs.

Figure 1:
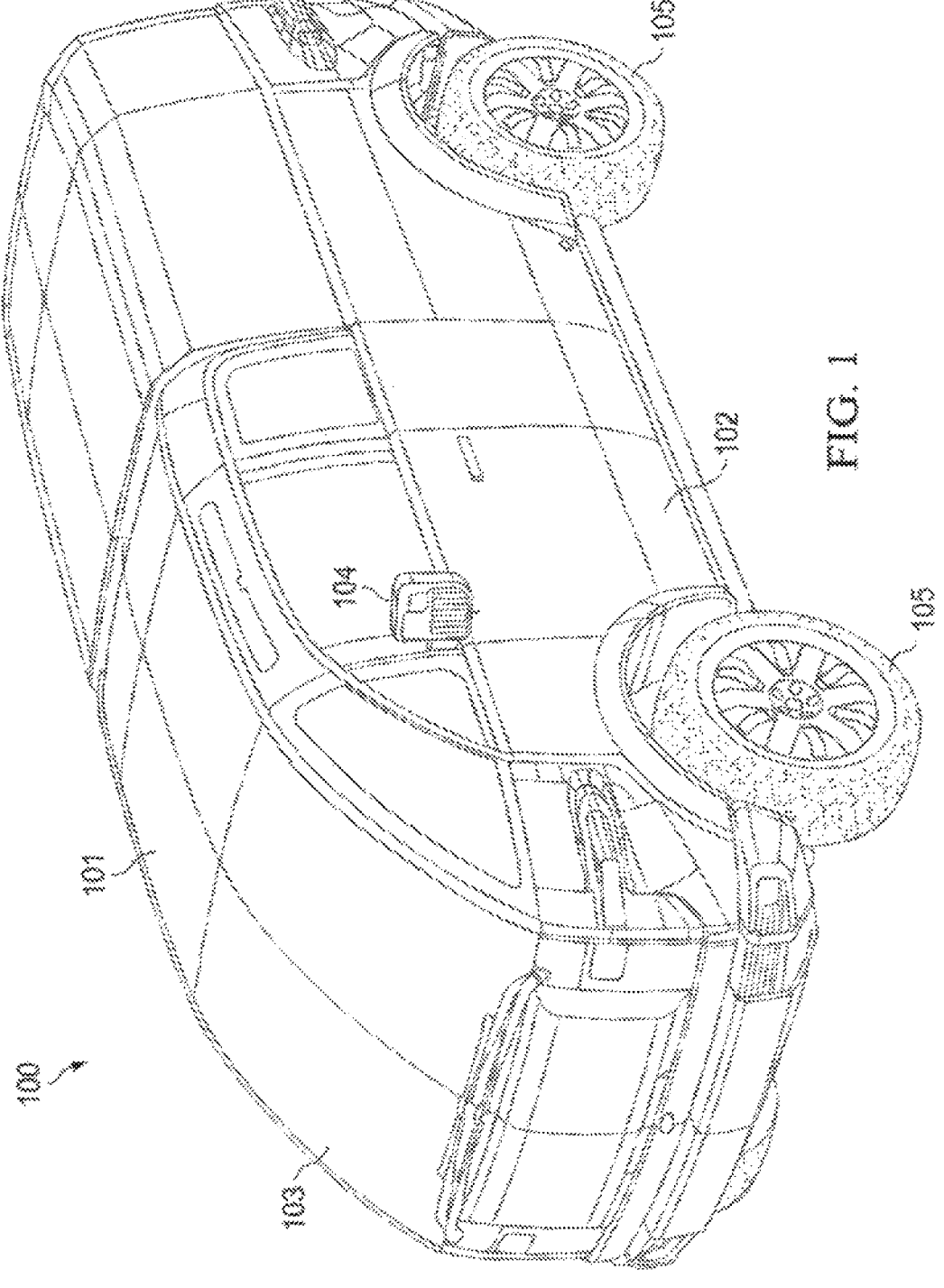
FIG. 1 is a perspective view of a vehicle 100 within which torque and heat generation is implemented in accordance with embodiments of the present disclosure.

FIG. 1 is a perspective view of a vehicle 100 within which torque and heat generation is implemented in accordance with embodiments of the present disclosure. The embodiment of the vehicle 100 illustrated in FIG. 1 is for illustration and explanation only. FIG. 1 does not limit the scope of this disclosure to any particular implementation.

The vehicle 100 of FIG. 1 includes a chassis (not visible in FIG. 1) supporting a cabin 101 for carrying at least one passenger (the operator). In some embodiments, the vehicle 100 is an EV in which the chassis is in the form of a "skateboard" vehicle platform supporting one or more energy storage elements (e.g., batteries) that provide input electrical power used by various components of the EV, such as one or more electric motors of the vehicle 100 and a control system of the electric vehicle described in further detail below.

Passengers may enter and exit the cabin 101 through at least one door 102 forming part of the cabin 101. A transparent windshield 103 and other transparent panels mounted within and forming part of the cabin 101 allow at least one passenger (referred to as the "operator." even when the vehicle 100 is operating in an AD mode) to see outside the cabin 101. Rear view mirrors 104 mounted to sides of the cabin 101 enable the operator to see objects to the sides and rear of the cabin 101 and may include warning indicators (e.g., selectively illuminated warning lights) for blind spot warning and/or lane departure warning.

Wheels 105 mounted on axles that are supported by the chassis and driven by the motor(s) (all not visible in FIG. 1) allow the vehicle 100 to move smoothly. The wheels 105 are mounted on the axles in a manner permitting rotation relative to a longitudinal centerline of the vehicle 100 for steering and are also connected to steering controls (not visible). Conventional automobile features such as headlamps, taillights, turn signal indicators, windshield wipers, and bumpers are also depicted. The vehicle 100 may further include cargo storage within or connected to the cabin 101 and mounted on the chassis, with the cargo storage area(s) optionally partitioned by dividers from the passenger area(s) of the cabin 101.

In the present disclosure, the vehicle 100 includes drive line induced vibration mitigation control as described below.

Although FIG. 1 illustrates one example of a vehicle 100, those skilled in the art will recognize that the full structure and operation of a suitable vehicle are not depicted in the drawings or described here. Instead, for simplicity and clarity, only the structure and operation necessary for an understanding the present disclosure is depicted and described. Various changes may be made to the example of FIG. 1.

Figure 2:
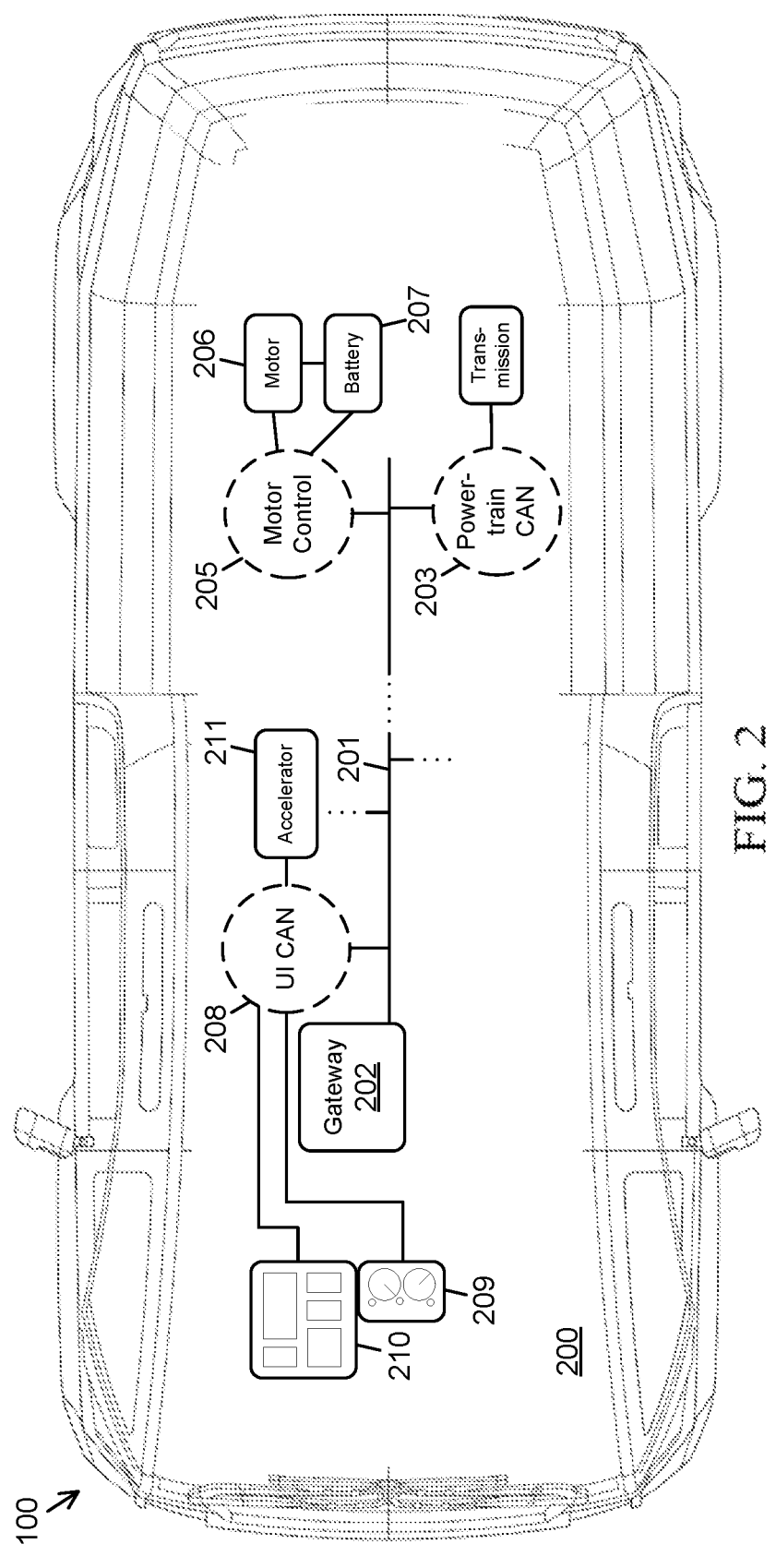
FIGS. 2 and 2A depict a vehicle control system 200 for a vehicle within which torque and heat generation is implemented in accordance with embodiments of the present disclosure.
Figure 2A:
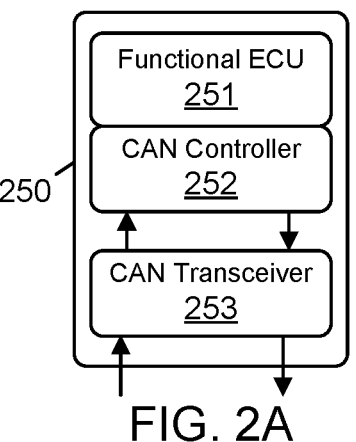

FIGS. 2 and 2A depict a vehicle control system 200 for a vehicle within which torque and heat generation is implemented in accordance with embodiments of the present disclosure. The embodiment of the vehicle control system 200 illustrated in FIGS. 2 and 2A is for illustration and explanation only. FIGS. 2 and 2A do not limit the scope of this disclosure to any particular implementation of a vehicle control system.

FIG. 2 depicts a modern vehicle control system 200 utilizing various electronic control units (ECUs) interconnected on a controller area network (CAN) via the so-called CAN bus. The standard for the CAN bus was released around 1993 by the International Organization for Standardization (ISO) as ISO 11898. The current version of that standard is ISO 11898-1:2015, and the CAN busses described herein may comply with that standard in some embodiments. Each ECU typically includes a printed circuit board (PCB) with a processor or microcontroller integrated circuit coupled to various input sensors, switches, relays, and other output devices. The CAN design permits the ECUs to communicate with each other without the need for a centralized host. Instead, communication takes place on a peer-to-peer basis. The CAN design therefore permits data from sensors and other ECUs to circulate around the vehicle ECUs, with each ECU transmitting sensor and programming information on the CAN bus while simultaneously listening to the CAN bus to pull out data needed to complete tasks being performed by that ECU. There is no central hub or routing system, just a continuous flow of information available to all the ECUs.

By way of example, power doors on a vehicle may be operated by an ECU called the body control module (not shown in FIG. 2). Sensors constantly report whether the doors are open or closed. When the driver pushes a button to close a door, the signal from that switch is broadcast across the CAN bus. When the body control module ECU detects that signal, however, the body control module ECU does not simply close the door. Instead, the body control module ECU first checks the data stream to make sure the vehicle is in park and not moving and, if all is well, gives a command to a power circuit that energizes the motors used to close the door. The body control module ECU may go even further, such as by monitoring the voltage consumed by the motors. If the body control module ECU detects a voltage spike, which happens when a door is hindered by an errant handbag or a wayward body part, the ECU immediately reverses the direction of the door to prevent potential injury. If the door closes properly, the latch electrically locks the door shut, which is an event that may be detected by the body control module ECU.

Notably, vehicle control systems are migrating to higher-speed networks with an Ethernet-like bus for which each ECU is assigned an Internet protocol (IP) address. Among other things, this may allow both centralized vehicle ECUs and remote computers to pass around huge amounts of information and participate in the Internet of Things (IoT).

In the example shown in FIG. 2, the vehicle control system 200 includes a CAN bus 201 embodied or controlled by a gateway ECU 202, which facilitates messages on and among CANs, transmitted and detected by ECUs. FIG. 2 illustrates a powertrain CAN 203 to which a transmission ECU 204 is connected and a motor control CAN 205 to which a traction motor ECU 206 is connected. (The traction motor and the traction motor ECU are both represented by block 206 in FIG. 2, and the battery and battery ECU are both represented by block 207.) The traction motor coupled to motor CAN 205 by the traction motor ECU 206 is powered by the battery (via battery ECU 207), and is disposed proximate to the battery so that excess heat from the motor warms the battery. The traction motor ECU 206 controls speed and/or torque of the traction motor (e.g., in response to acceleration or braking commands).

In the example shown, the vehicle control system 200 in FIG. 2 also includes a user interface (UI) CAN 208 to which a "dashboard" ECU 209, a touchscreen ECU 210, and an accelerator/brake ECU 211 are connected. The UI CAN 208 and the associated ECUs 209, 210, and 211 allow the operator to set relevant operating parameters such as speed, or to activate cruise control.

FIG. 2A illustrates a high level block diagram for the architecture 250 of each CAN depicted in FIG. 2. Each CAN shown in FIG. 2 includes a functional CAN ECU 251 for the specific function performed by the respective CAN (e.g., speed and driving mode control in the case of UI CAN 208). The functional CAN ECU 251 is coupled to a CAN processor/controller 252 that controls the interactions of the respective CAN with the other CANs within the vehicle 100 through the gateway ECU 202. A CAN transceiver 253 receives messages from and transmit messages to other CANs under the control of the CAN processor/controller 252.

Although FIGS. 2 and 2A illustrate one example of a vehicle control system 200, those skilled in the art will recognize that the full structure and operation of a suitable vehicle control system is not depicted in the drawings or described here. Instead, for simplicity and clarity, only the structure and operation necessary for an understanding of the present disclosure is depicted and described. Various changes may be made to the example of FIGS. 2 and 2A, and the improved lateral acceleration control described in this disclosure may be used with any other suitable vehicle control system.

Figure 3:
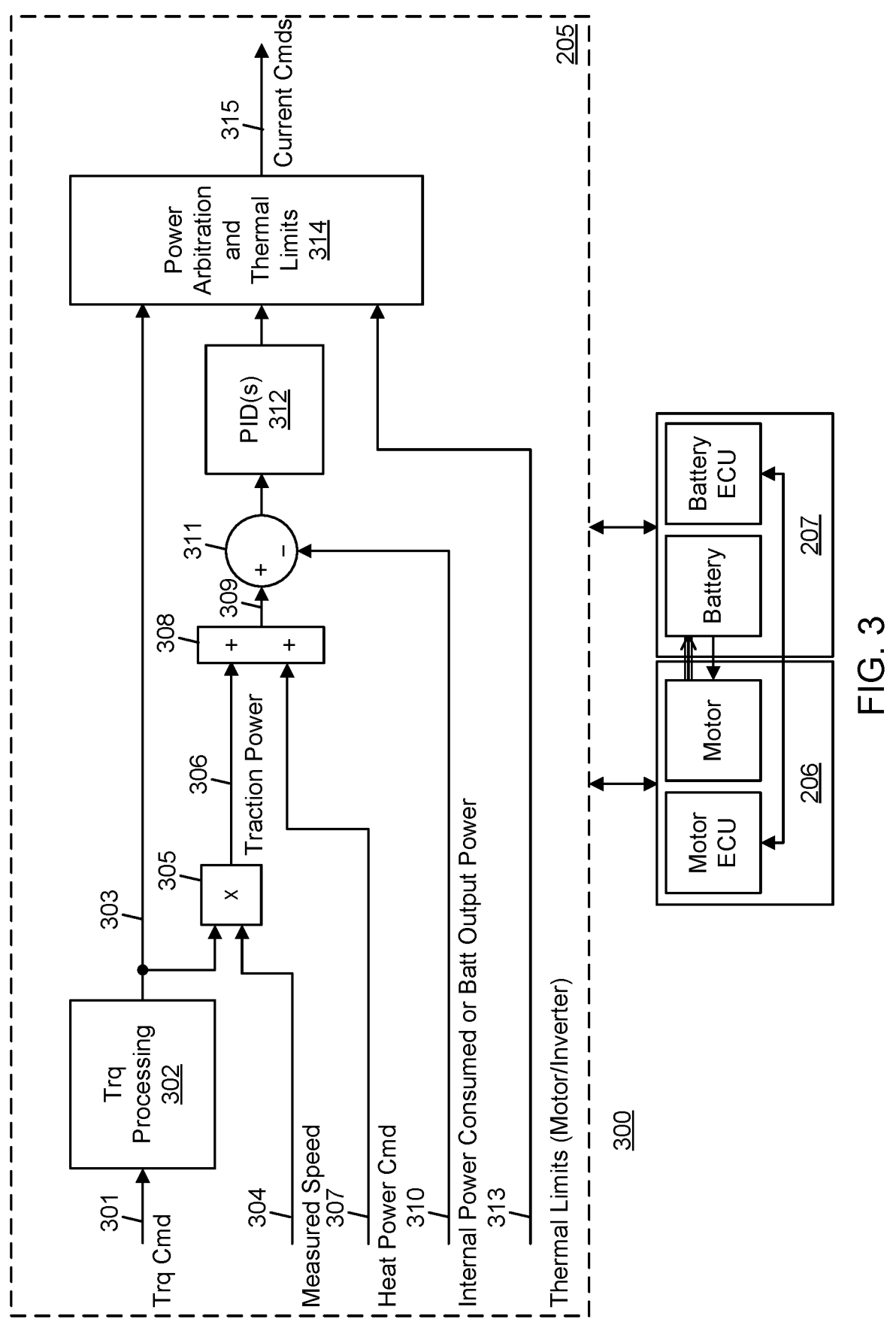
FIG. 3 schematically illustrates control of torque and heat production in an internal permanent magnet traction motor in accordance with embodiments of the present disclosure.

FIG. 3 schematically illustrates control of torque and heat production in an internal permanent magnet (IPM) traction motor in accordance with embodiments of the present disclosure. The embodiment 300 of torque and heat production shown in FIG. 3 is for illustration and explanation only. FIG. 3 does not limit the scope of this disclosure to any particular implementation of a vehicle. Torque and heat production by the traction motor are implemented within vehicle 100, in part under the control of motor control CAN 205 operating in conjunction with traction motor ECU 206 and/or battery ECU 207.

In the embodiment 300 of FIG. 3, a torque (Trq) command (Cmd) 301 is received, for example in response to the driver pressing on the accelerator pedal or brake pedal, or from a vehicle integrated control module (VICM) when the vehicle is operating in a cruise control mode. The torque command 301 is pre-processed by torque processing 302 to generate a motor torque 303. A measurement of the motor speed 304 for the traction motor is also received from (for example) a sensor coupled at the motor output to the drive shaft or another component of the drive line. A product of the motor power 303 and the motor speed 304 is determined by multiplier 305 to calculate traction power 306 for the traction motor.

A heat power command 307 that is received in the embodiment 300 corresponds to heat needed to warm the vehicle battery. The heat needed may be determined based (for example) on one or more of battery temperature as measured by a sensor for the battery or the ambient temperature within which the vehicle is being operated. The traction power 306 and the heat power command 307 are combined by adder 308 to determine total required motor power 309. The internal power consumed or battery output power 310 is also received, for example from a sensor coupled to one or both terminal(s) for the battery. The battery output power 310 is subtracted from the total required motor power 309 by adder 311, and the result is provided to one or more proportional-integral-derivation (PID) controller(s) 312.

A thermal limit(s) signal 313 indicating maximum (and minimum) temperature(s) for the motor and or an inverter connected thereto is received, and used by power arbitration and thermal limits controller 314 together with the output of PID(s) 312 and motor power 303 corresponding to the torque command 301. Power arbitration and thermal limits controller 314 outputs current commands 315 to one or both of the motor ECU 206 and/or the battery ECU 207. The current commands 315 control the operating mode of the motor and the current provided by the battery to the motor. As shown in FIG. 3, in addition to one or more electrical signal path(s) between the battery and the motor, for conducting current from the battery to the motor, a thermal conduction path for transferring heat from the motor to the battery is provided, between the motor and battery. Embodiment 300 is relatively self-contained.

Figure 4A:
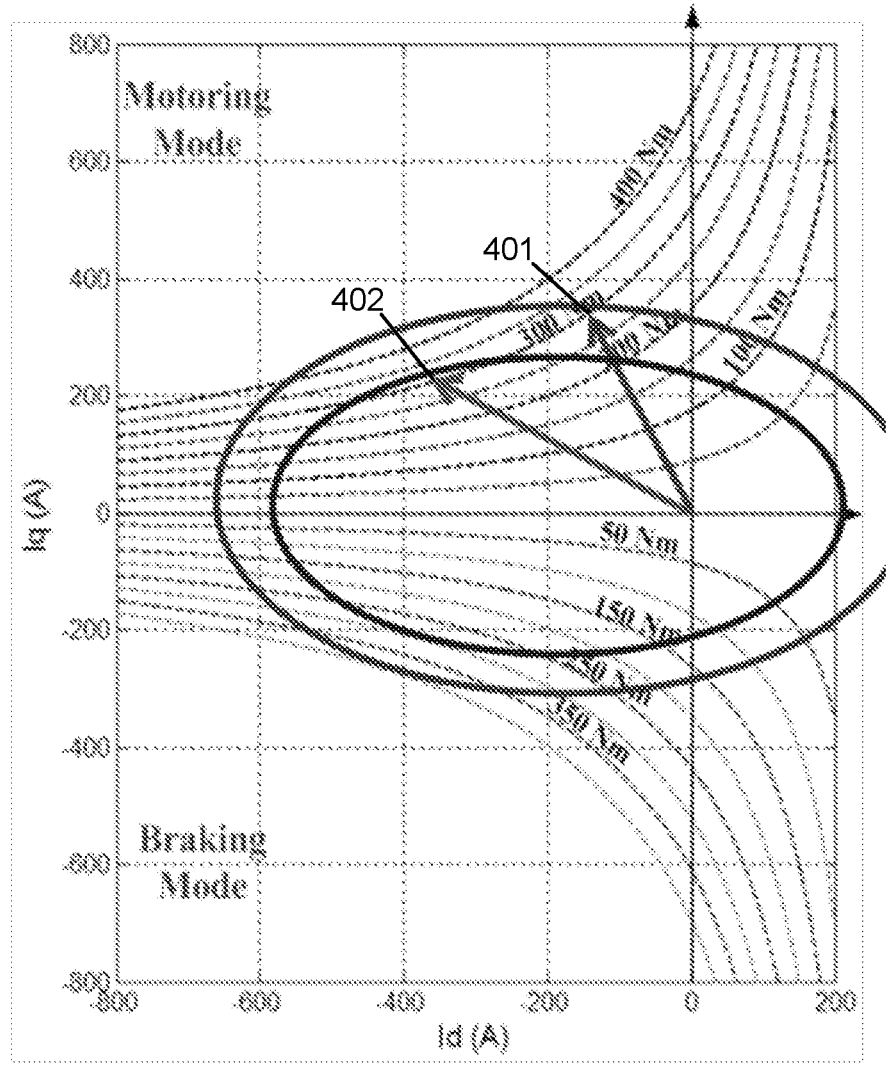
FIGS. 4A and 4B respectively illustrate torque as a function of d-axis and q-axis current.
Figure 4B:
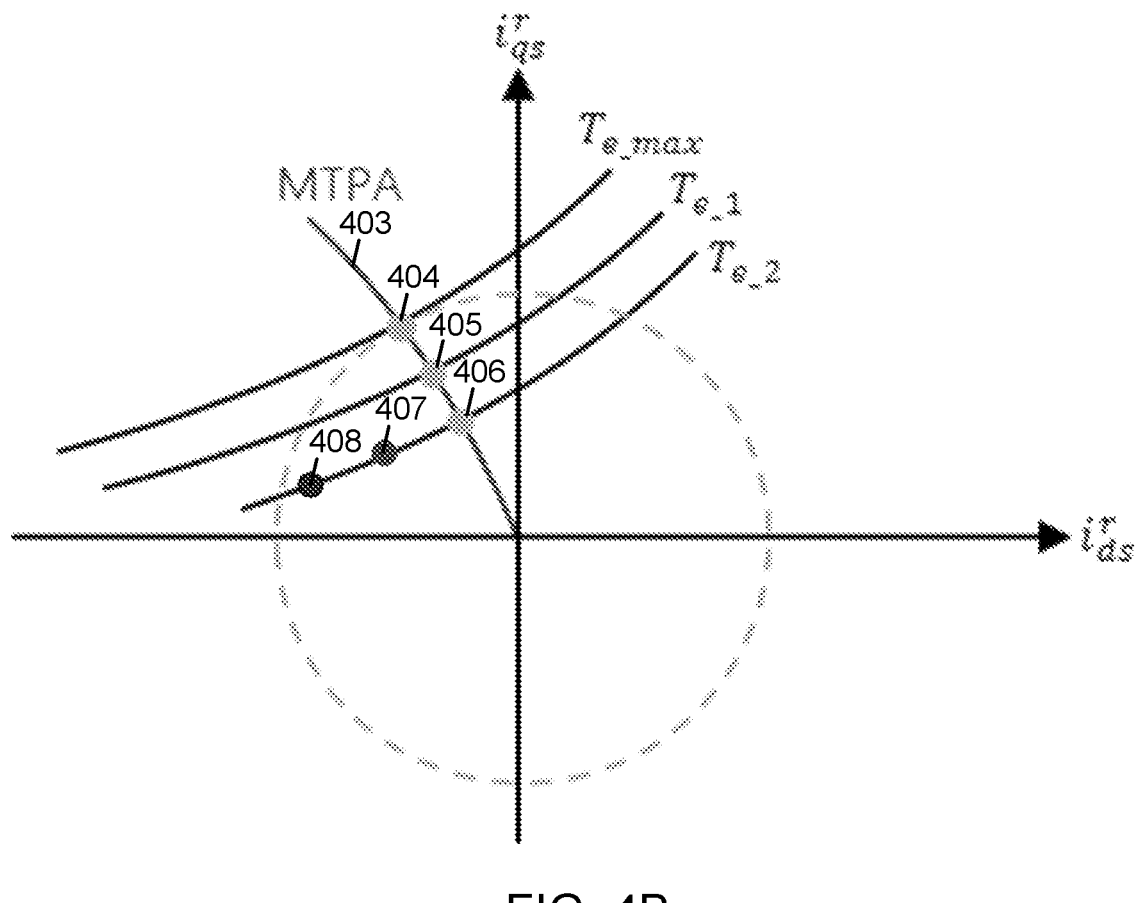

FIGS. 4A and 4B respectively illustrate torque as a function of d-axis and q-axis current, with FIG. 4B having an enlarged scale relative to FIG. 4A. The torque $T_e$ produced by an internal permanent magnet synchronous motor based on three phase current may be determined from $$T_e = \left(\frac{3P_n}{2}\right)[\lambda_m i_q - (L_q - L_d)i_q i_d],$$

where $i_d$ is direct-axis (d-axis) current, $i_q$ is quadrature-axis (q-axis) current, $L_d$ is d-axis inductance, $L_q$ is q-axis inductance, $P_n$ is a number of poles, and $\lambda_m$ is a motor-specific parameter. In FIG. 4A, two operating points 401, 402 for achieving 300 Newton-meters (Nm) of torque are identified, to illustrate that the same torque can be achieved with different efficiencies. In FIG. 4B, a line 403 of MTPA operating points 404, 405, and 406 are indicated, respectively for maximum achievable torque $T_{e\_max}$ (given the motor design) and two lower amounts of torque $T_{e\_1}$ and $T_{e\_2}$. For torque $T_{e\_2}$, two less efficient operating points 407 and 407 are also indicated, with the current required for operating point 408 greater than that required for operating point 407, which is in turn greater than the current required for operating point 406. In the present disclosure, the operating point is purposely moved away from the MTPA line 403 to produce torque inefficiently, generate heat to warm the battery.

Figure 5:
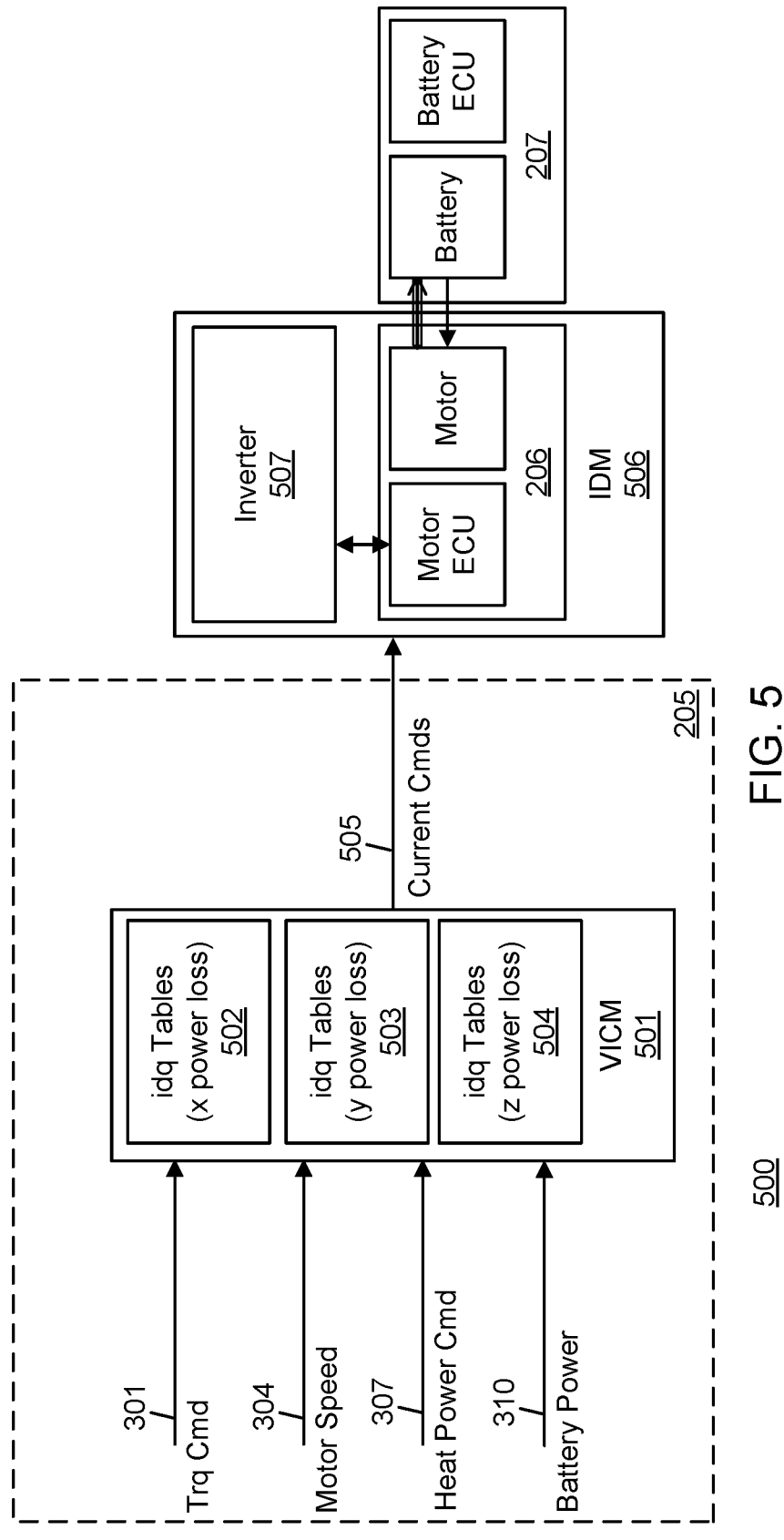
FIG. 5 schematically illustrates an alternative system for controlling torque and heat production in an internal permanent magnet traction motor in accordance with embodiments of the present disclosure.

FIG. 5 schematically illustrates an alternative system for control of torque and heat production in an IPM traction motor in accordance with embodiments of the present disclosure. The embodiment 500 shown in FIG. 5 is for illustration and explanation only. FIG. 5 does not limit the scope of this disclosure to any particular implementation. As with embodiment 300, torque and heat production by the traction motor is implemented within vehicle 100, in part under the control of motor control CAN 205 operating in conjunction with traction motor ECU 206 and/or battery ECU 207.

In embodiment 500, the same torque command 301 and heat power command 307 are received as in embodiment 300. A vehicle integrated control module (VICM) 501 contains tables 502, 503, and 504. These tables take as inputs the torque command 301, the heat power command 307, the motor speed 304, and the battery voltage 310. The outputs of these tables are specific Id and Iq current commands 505 that would generate the requested torque under the given voltage and speed conditions. The difference between tables 502 to 504 is that table 502 contain, for a given desired torque, the current commands for the minimum possible power loss in the motor/inverter (corresponding to operating point 406); whereas tables 503 and 504 contain, for the same requested torque as produced by operating point 406, the current commands that produce higher losses (e.g., corresponding to one of operating points 407 or 408). For the same desired torque, the power loss in 504 would be higher than the power loss in 503. In other words, for a given desired torque table 502 will include operating point 406, table 503 operating point 407, and table 504 operating point 408. Based on power loss command and the desired torque, VICM selects current commands 505 resulting from the interpolation of the appropriate Idq table outputs. Current commands 505 get communicated to an inverter drive module (IDM) 506. IDM 506 controls an inverter 507 to cause operation of the motor at the selected operating point. Embodiment 500 is based on look up tables, and therefore required more memory but lacks the benefits (and drawbacks) of using feedback.

FIG. 6 is a high level flowchart for a process of torque and heat generation in accordance with embodiments of the present disclosure. The process 600 shown in FIG. 6 is for illustration and explanation only. FIG. 6 does not limit the scope of this disclosure to any particular implementation.

The process 600 begins with receiving a torque command for a torque causing operation of a vehicle electric motor at a desired speed and a heat power command for an amount of heat for warming a battery powering the vehicle electric motor (step 601). An operating point of the vehicle electric motor corresponding to both the torque and the amount of heat is determined (step 602). The vehicle electric motor is controlled based on the determined operating point (step 603).

It may be advantageous to set forth definitions of certain words and phrases used throughout this patent document.

The terms "include" and "comprise," as well as derivatives thereof, mean inclusion without limitation. The term "or" is inclusive, meaning and/or. The phrase "associated with," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

The description in the present disclosure should not be read as implying that any particular element, step, or function is an essential or critical element that must be included in the claim scope. The scope of patented subject matter is defined only by the allowed claims. Moreover, none of the claims invokes 35 U.S.C. § 112 (f) with respect to any of the appended claims or claim elements unless the exact words "means for" or "step for" are explicitly used in the particular claim, followed by a participle phrase identifying a function. Use of terms such as (but not limited to) "mechanism," "module," "device," "unit," "component," "element," "member," "apparatus," "machine," "system," "processor," or "controller" within a claim is understood and intended to refer to structures known to those skilled in the relevant art, as further modified or enhanced by the features of the claims themselves, and is not intended to invoke 35 U.S.C. § 112 (f).

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed:

1. A method, comprising:
   receiving a torque command for a motor torque causing operation of a vehicle electric motor at a desired speed;
   receiving a heat power command for an amount of heat for warming a battery powering the vehicle electric motor;
   determining an operating point of the vehicle electric motor corresponding to both the motor torque and the amount of heat by at least
   measuring a speed of the vehicle electric motor,
   determining a traction output power as a product of the motor torque and the measured speed of the vehicle electric motor,
   determining a required total motor power equal to the traction output power plus the heat power command, and
   determining direct-axis (d-axis) and quadrature axis (q-axis) current commands for controlling the electric motor to operate at the determined operating point based upon the required total motor power such that the operating point is selected away from a maximum torque per amp (MTPA) operating point to increase motor losses while maintaining the motor torque; and
   controlling the vehicle electric motor based on the determined operating point.

2. The method according to claim 1 wherein determining the d-axis and q-axis current commands for controlling the vehicle electric motor further comprises:

measuring battery output power; and subtracting the battery output power from the required total motor power to determine a required electrical input power for the electrical motor.

3. The method according to claim 2, further comprising:

applying a proportional-integral-derivative (PID) control to the required electrical input power.

4. The method according to claim 3, further comprising:

applying thermal limits to an output of the PID control.

5. The method according to claim 1, wherein determining an operating point further comprises:

processing the torque command to determine the motor torque.

6. The method according to claim 1, wherein the heat power command is based on one or more of a battery temperature and an ambient temperature.

7. The method according to claim 1, wherein determining the d-axis and q-axis current commands further comprises:

based on the torque command and the heat power command, looking up the d-axis and q-axis current commands in power loss tables that include operating points corresponding to both MTPA operating points and non-MTPA operating points having higher power losses.

8. The method according to claim 7, wherein the current commands are forwarded to an integrated dynamic-control module.

9. The method according to claim 1, wherein controlling the vehicle electric motor further comprises:

controlling an inverter coupled to the vehicle electric motor.

10. A system, comprising:

a vehicle electric motor; and a motor controller configured to receive a torque command for a motor torque causing operation of the vehicle electric motor at a desired speed, receive a heat power command for an amount of heat for warming a battery powering the vehicle electric motor, determine an operating point of the vehicle electric motor corresponding to both the motor torque and the amount of heat by at least measuring a speed of the vehicle electric motor, determining a traction output power as a product of the motor torque and the measured speed of the vehicle electric motor, determining a required total motor power equal to the traction output power plus the heat power command, and determining direct-axis (d-axis) and quadrature axis (q-axis) current commands for controlling the electric motor to operate at the determined operating point based upon the required total motor power such that the operating point is selected away from a maximum torque per amp (MTPA) operating point to increase motor losses while maintaining the motor torque, and control the vehicle electric motor based on the determined operating point.

11. The system according to claim 10, wherein the motor controller is configured to determine the d-axis and q-axis current commands for controlling the vehicle electric motor by:

measuring battery output power; and subtracting the battery output power from the required total motor power to determine a required electrical input power for the electric motor.

12. The system according to claim 11, wherein the motor controller is configured to:

apply a proportional-integral-derivative (PID) control to the determined required electrical input power.

13. The system according to claim 12, wherein the motor controller is configured to:

apply thermal limits to an output of the PID control.

14. The system according to claim 10, wherein the motor controller is further configured to determine the operating point by:

processing the torque command to determine the torque.

15. The system according to claim 10, wherein the heat power command is based on one or more of a battery temperature and an ambient temperature.

16. The system according to claim 10, wherein the motor controller is further configured to determine the d-axis and q-axis current commands by:

based on the torque command and the heat power command, looking up d-axis and q-axis current commands in power loss tables that include operating points corresponding to both MTPA operating points and non-MTPA operating points having higher power losses.

17. The system according to claim 16, further comprising:

an integrated dynamic-control module to which the current commands are forwarded.

18. The system according to claim 10, wherein the motor controller is further configured to control the vehicle electric motor by:

controlling an inverter coupled to the vehicle electric motor.

* * * * *